United States Patent [19]

Klingler et al.

[11] Patent Number: 5,068,653
[45] Date of Patent: Nov. 26, 1991

[54] CAPACITIVE DISPLACEMENT MEASURING DEVICE WITH T-SHAPED SCALE COATINGS

[75] Inventors: Otto Klingler, Oberndorf-Bochingen; Siegfried Gruhler, Vohringen; Helmut Rivinius, Bonningheim, all of Fed. Rep. of Germany

[73] Assignee: Mauser-Werke Oberndorf GmbH, Fed. Rep. of Germany

[21] Appl. No.: 670,349

[22] Filed: Nov. 9, 1984

[30] Foreign Application Priority Data

Nov. 11, 1983 [DE] Fed. Rep. of Germany ....... 3340782

[51] Int. Cl.$^5$ .............................................. G08C 19/10
[52] U.S. Cl. .................................. 340/870.37; 324/161; 324/659
[58] Field of Search ........................... 324/60 C, 61 R; 340/870.25, 870.31, 870.32, 870.37

[56] References Cited

U.S. PATENT DOCUMENTS

| | | | |
|---|---|---|---|
| 3,146,394 | 8/1964 | Frisch | 340/820.37 |
| 3,221,256 | 11/1965 | Walden | 340/870.37 |
| 3,348,133 | 10/1967 | Wolfendale | 340/870.37 |
| 3,845,377 | 10/1974 | Shimotori | 340/870.37 |
| 3,961,318 | 6/1976 | Farrand | 340/870.37 |
| 4,223,300 | 9/1980 | Wiklund | 340/870.32 |
| 4,242,666 | 12/1980 | Reschovsky | 340/870.37 |
| 4,339,709 | 7/1982 | Brihier | 340/870.37 |
| 4,562,430 | 12/1985 | Robinson | 340/870.37 |
| 4,573,048 | 2/1986 | Dash | 340/870.37 |

FOREIGN PATENT DOCUMENTS 2853142 12/1978 Fed. Rep. of Germany .
539837 9/1973 Switzerland .

Primary Examiner—John W. Caldwell, Sr.
Assistant Examiner—Tyrone Queen
Attorney, Agent, or Firm—McGlew and Tuttle

[57] ABSTRACT

A capacitance length and/or angle measuring device has a transducer comprising a stationary part (1) forming a scale and a part (2) displaceable parallel over the surface of the scale, at a short distance therefrom and acting as a sensing unit. The opposite surfaces of the scale and sensing unit are provided with capacitor coatings (5,6,7,8,9). The mechanical quantity to be measured causes an area vibration of a capacitor, the capacitance variation resulting therefrom acting as a variable capacitive reactance in a circuit, which changes the phase position of the electrical signals. With an appropriate configuration of the capacitor surfaces one obtains a linear function between the mechanical quantity to be measured and the phase portion of the signals.

11 Claims, 3 Drawing Sheets

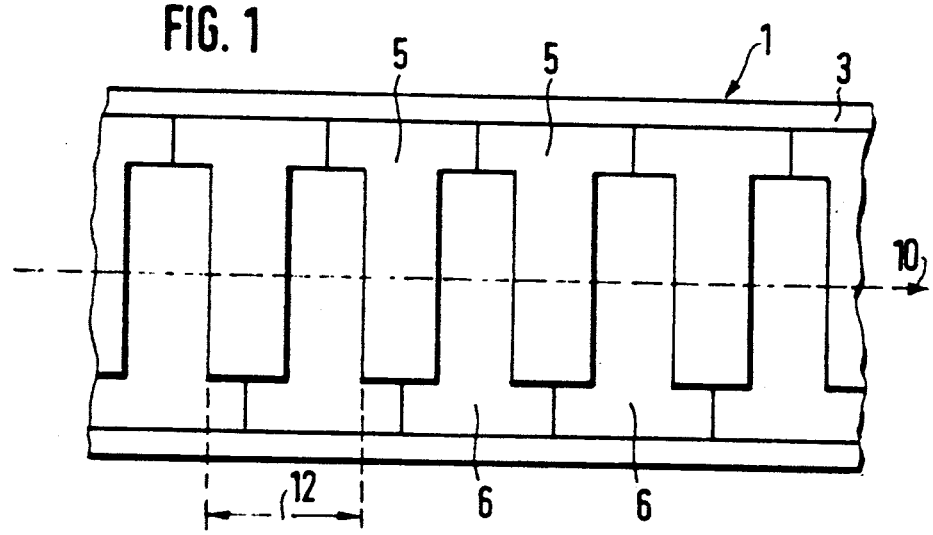
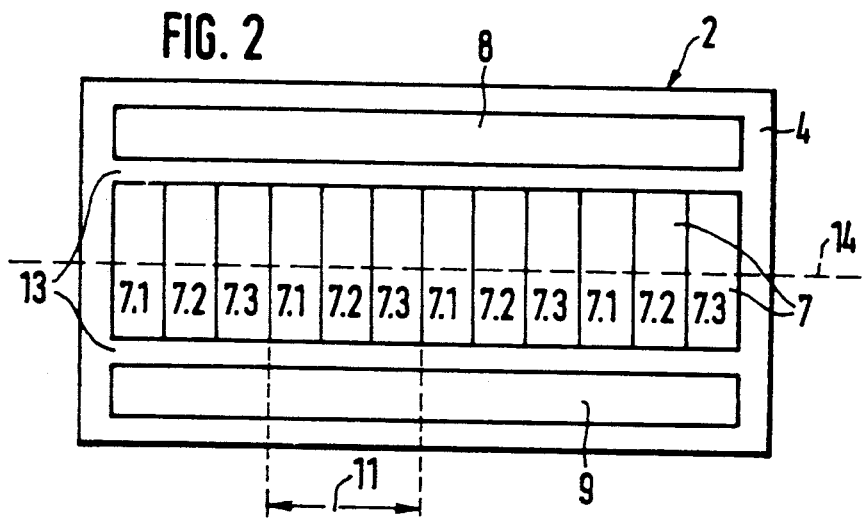
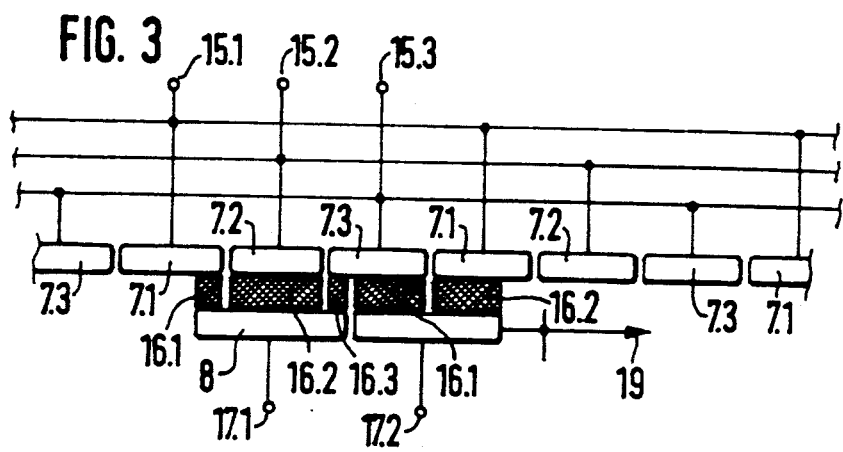

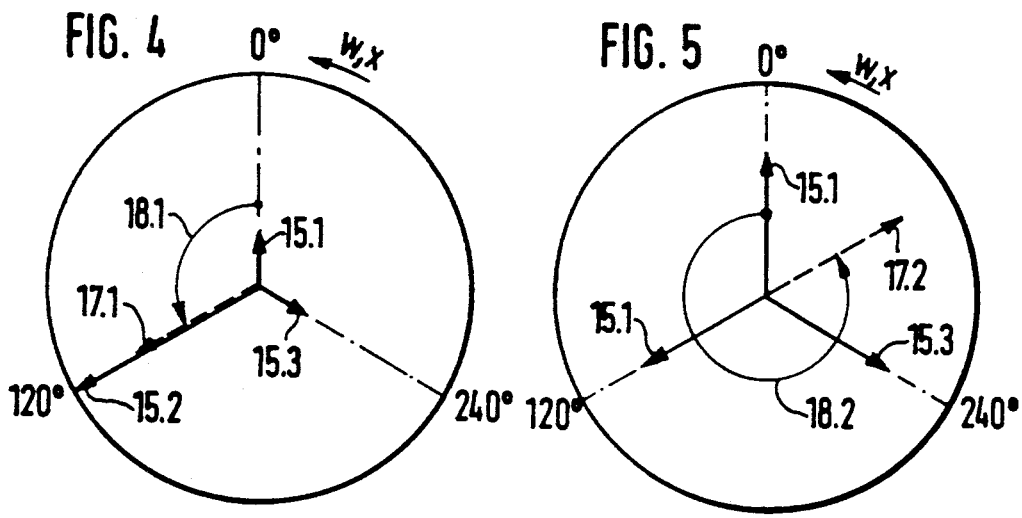
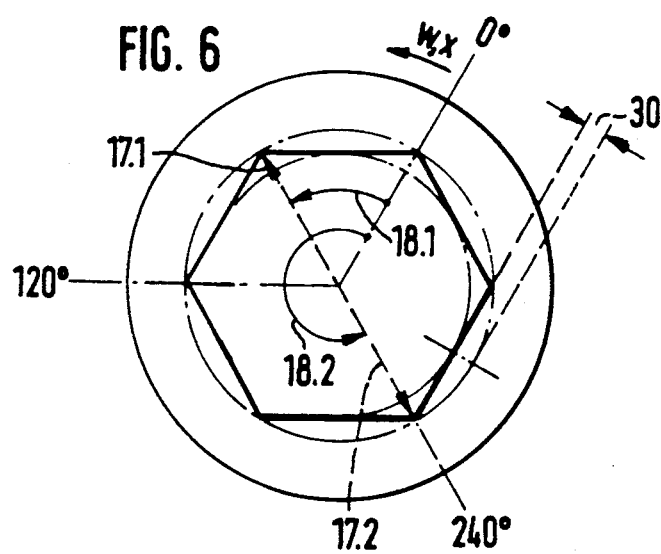
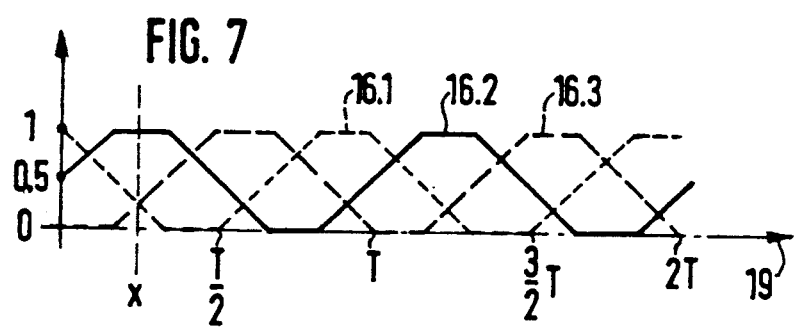

CAPACITIVE DISPLACEMENT MEASURING DEVICE WITH T-SHAPED SCALE COATINGS

FIELD AND BACKGROUND OF THE INVENTION

The present invention relates in general to electronic measuring devices, and in particular to a new and useful capacitive length and/or angle measuring device, the transducer of which consists of a stationary part and a part which is displaceable parallel thereto over the surface thereof at a short distance. The opposite surface of the stationary and displaceable parts are provided with capacitor coatings.

Capactive transducers designed as differential capacitors are known. In practice, however, difficulties arise especially when measuring relatively great lengths with such known differential capacitors. To eliminate such difficulties, according to Swiss Patent 539,837 several differential capacitors are arranged one behind the other in a capacitive length measuring device. If in the displacement the measurement range of this differential capacitor is exceeded, expensive circuitry is needed to connect the differential capacitor next following in the direction of displacement to the electronic circuit device. In this system, the position information is contained in the amplitude of the feed voltages of the differential capacitor.

From German OS 28 53 142 a measuring device for capacitive determination of the relative positions of two mutually movable parts is further known, consisting essentially of a sliding piece and a scale. A phase angle $\phi$ of the receiver voltage is a linear function of the displacement of the sliding piece relative to the scale, if the transmitting voltages have sinusoidal form.

A disadvantage of this is that due to the small overlap between the transmitting electrodes and the scale electrodes the amplitude of the received signal is small. Another disadvantage is that the scale electrodes have a semi-sinusoidal form and therefore are difficult to produce with the necessary precision.

SUMMARY OF THE INVENTION

It is, therefore, the object of the present invention to provide a capacitive length and/or angle measuring device of the initially mentioned kind which avoids the above-mentioned disadvantages and makes it possible to realize at low cost for hardware, a measuring system of low energy requirements.

According to the invention, this problem is solved in that the stationary part constituting a scale consists of two rows of T-shaped capacitor coatings engaging in one another in comb fashion. The capacitor coatings of the displaceable part of the transducer act partly as transmitting electrodes and partly as receiving electrodes. The transmitting electrodes are powered with A.C. voltage in such a way that an electrical rotary field forms which generates A.C. voltages on the receiving electrodes, and the phase position from the transmitting signal to the receiving signal is proportional to the displacement between the stationary part and the displaceable part of the transducer. The two rows of capacitor coatings of the stationary part may be displaced relative to each other in the lengthwise direction, by one half a scale period ($\frac{1}{2}$T). The displaceable part of the transducer may constitute a plate-type sensing unit, on which rectangular capacitor coatings are arranged symmetrically with respect to the longitudinal axis of the plate.

Along the end faces of the capacitor coatings forming the transmitting electrodes there may extend a capacitor coating disposed crosswise as a receiving electrode in spaced relation, in such a way that the transmitting and receiving electrodes are perpendicular to each other.

Such a design of a capacitive length and angle measuring device permits large surface areas of the capacitor coating and hence a good capacitive coupling. By the symmetrical arrangement of the capacitor coatings further undesired capacitance variations e.g. due to air gap fluctuations, are compensated. The received signals are supplied to a differential amplifier.

According to the principle of the capacitive transducer of the invention, the mechanical quantity to be measured brings about an area variation of a capacitor, and the resulting capacitance variation acts as a variable capacitance reactance in a circuit, which changes the phase of the electrical signals. With the configuration of the capacitor surfaces according to the invention, one obtains a linear function between the mechanical quantity to be measured and the phase position of the signals.

In a further development of the invention, only the displaceable sensing unit can be connected to an electronic system, while the stationary part has no electrical connection.

The transmitting electrodes may be powered with sinusoidal A.C. voltages derived from square signals, and the received signals can be supplied to a differential amplifier whose output signal is digitalized by a zero crossing detector. Furthermore, the digitalized transducer signal may be supplied to a control circuit in such a way that the phase difference between the pickup signal and the reference signal is controlled to zero and the phase difference is evaluated digitally, the phase difference containing the position information to be measured.

An optimum and error free action is obtained according to a further development of the invention in that groups of three adjacent capacitor coatings of the displaceable part form one transmitting group, and that at least two transmitting groups are arranged side by side on the displaceable part. The receiving electrodes may extend perpendicular to and over all transmitting groups.

It is further advantageous to electrically insulate the transmitting electrodes and receiving electrodes from each other by a grounded shield.

According to further proposals of the invention, the stationary part may be a round bar on which a cylindrical part, act as a sensing unit, is axially displaceable. Alternatively the stationary part may be a preferably circular disc, spaced from which a parallel disc, as sensing unit, is rotatable about its center axis, whereby an angle measuring device is realized.

A further object of the invention is to provide a capacitive distance and/or angle measuring device which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 1 is a partial plan view of the stationary part of the inventive transducer;

FIG. 2 is a plan view of the displaceable part of the transducer of FIG. 1;

FIG. 3 is a circuit diagram of the transmitting groups powered with phase-shifted A.C. voltages in accordance with the invention;

FIG. 4 is a vector diagram for a first transmitting signal of the invention;

FIG. 5 is a vector diagram for a phase-shifted second transmitting signal;

FIG. 6 is a schematic representation of the locus curve of a receiver voltage of the invention;

FIG. 7 is a diagram showing the response of the partial capacitance;

DESCRIPTION OF THE PREFERRED EMBODIMENTS

Figure 8:
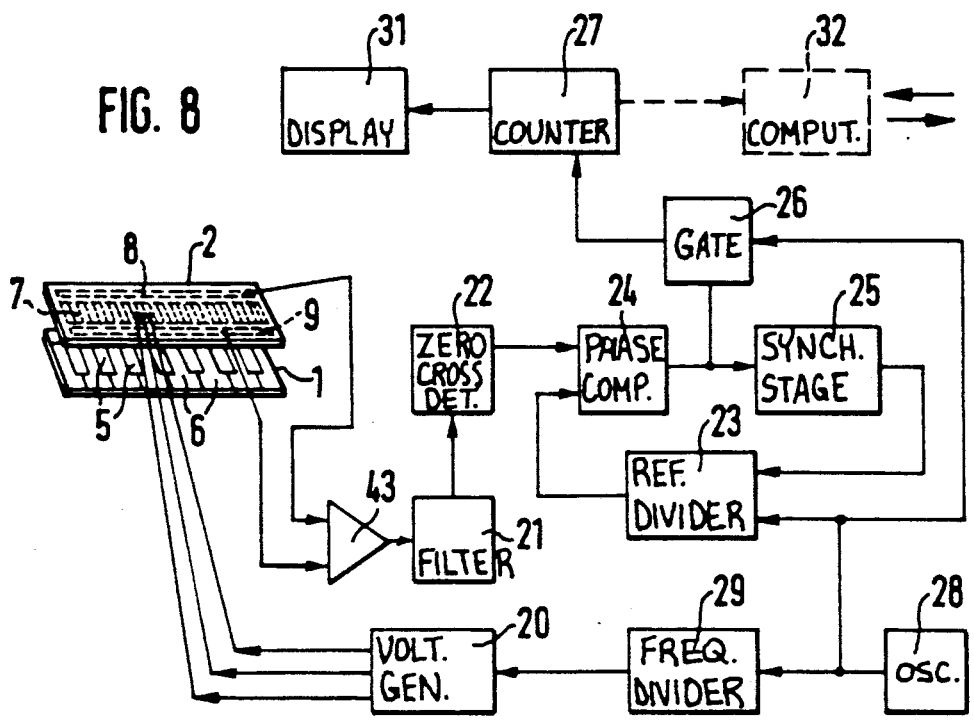
FIG. 8 is a block diagram of the electronic circuit system of the invention.

Referring to FIGS. 1 and 2, the transducer for a length and angle measuring device according to the invention comprises a stationary part 1, which forms the scale, and the displaceable part 2, which constitutes the sensing unit. The displaceable part 2 is mounted at a short distance above the stationary part 1 and is displaceable parallel thereto. The opposite surfaces 3 and 4 are provided with capacitor coatings 5,6,7,8 and 9. The coatings 5 and 6 of the stationary part 1 are T-shaped and applied on part 1 in such a way that there result two rows of coatings which interengage in comb fashion. The coatings 5 and 6 of the stationary part 1, or respectively of the scale, are not connected electrically. They are sensed contactlessly by the displaceable part 2. The capacitor coatings 7 (7.1 to 7.3) of the displaceable part 2 of the transducer are formed as rectangular coatings and arranged symmetrically on part 2 in direct juxtaposition. They function as transmitting electrodes. At an angle of 90° crosswise to the transmitting electrodes, on both end sides of the coatings 7 are the capacitor coatings 8 and 9, which function as receiving electrodes. As can be seen from FIG. 2, the receiving electrodes 8 and 9 extend over the entire arrangement of the transmitting electrodes 7.

The transmitting electrodes 7 are powered with A.C. voltage in such a way that an electrical rotary field is formed which generates, at the receiving electrodes 8,9, A.C. voltages whose phase depends on the position of the displaceable part 2 relative to the stationary part 1. For the digital measuring of a length or of an angle, the capacitive transducer is included in a digital system which produces the transmission signals and evaluates the received signals.

The two rows of interengaging capacitor coatings 5 and 6 are shifted relatively to each other by one half scale period in longitudinal direction 10 according to FIG. 1. Groups of three adjacent coatings 7.1, 7.2 and 7.3 of the sensing unit 2 form one transmitting group 11. To this end several transmitting groups 11 are arranged side by side on part 2. The width of a transmitting group 11 corresponds to the width 12 of two adjacent webs or legs of the T-shaped coatings 5 and 6 of the stationary part.

When the part 2 overlies the scale 1, the electrodes 7 overlie the legs only of the coating 5 and 6, and the electrodes 8 and 9 overlie the crosses of the T-shaped coatings 5 and 6 respectively.

The signals sent by the transmitting electrodes 7 of part 2 to scale 1 are fed back by the coatings 5,6 to the receiving electrodes 8,9 of the sending unit 2. By the simultaneous sensing of several transmitting groups 11 the influence of accidental errors of the scale division is reduced. By the arrangement according to the invention of the receiving electrodes 8, 9 of sensing unit 2 relative to the coatings 5,6 of scale 1 one achieves a phase shift between the two received signals of one half scale period. To prevent direct crosstalk from the transmitter to the receiver in the sensing unit, the transmitting electrodes 7 must be electrically insulated from the receiving electrodes 8,9 by a grounded shield 13.

The symmetrical arrangement of the coatings 7, 8, 9 of the sensing unit 2 with respect to the displacement axis 14 and the amplification axis 14 and the amplification of the two received signals phase-shifted by 180° by means of differential amplifier bring about a doubling of the signal and an extensive compensation of the error signals that may be caused by tilting about the displacement axis 14.

The electrical connection of the transmitting electrodes 7 and of the receiving electrodes 8, 9 to the electronic circuit device according to FIG. 8 occurs over the back of the displaceable part 2 as shown in FIG. 3.

The coatings 7.1, 7.2, 7.3 of each transmitting group 11 are powered with three sinusoidal A.C. voltages at 15.1, 15.2 and 15.3 of equal amplitude and equal frequency, phase-shifted by 120° from the relation:

$$15.1 = 15.1 \times \sin(wt)$$

$$15.2 = 15.2 \times \sin(wt + 120°)$$

$$15.3 = 15.3 \times \sin(wt + 240°)$$

At the receiving electrodes 8 and 9 a superposition of the transmission voltages occurs according to the variable partial capacitances 16.1, 16.2 and 16.3 (see also FIG. 7) which are dependent on the position of the sensing unit 2 relative to scale 1. The voltages at 17.1 and 17.2 resulting at the receiving electrodes are again sinusoidal A.C. voltages with the same frequency as the transmission voltages 15.1, 15.2 and 15.13. They have a phase position $\phi$ relative to the transmitting voltage 15.1 which is dependent on the position between scale 1 and the sensing unit 2 according to the notation:

$$17.1 = 17.1 \times \sin(wt + 18.1)$$

$$17.2 = 17.2 \times \sin(wt + 18.2)$$

Hence:

$$18.1 = 18.2 + 180°.$$

The amplitude is dependent on the value of the partial capacitances.

The arrangement of the capacitor coatings 5,6,7,8,9 on scale 1 and the sensing unit 2 brings about that always two or three transmitting voltages participate in the signal transmission. By the vector diagram in FIGS. 4 and 5 the superposition of the transmitting voltages and the resulting receiver voltages can be illustrated graphically. There are shown in FIGS. 4 and 5 the vector diagrams with the peak values for the position of the transducer shown in FIG. 3.

The phase angle $\phi$ at 18.1 between the receiving signal voltage 17.1 and the transmitting signal voltage 15.1 according to FIG. 4 is proportional to the displacement 19 between scale 1 and sensing unit 2. The same applies to the phase angle $\phi$ at 18.2 between the receiving signal voltage 17.2 and the transmitting signal voltage 15.1. The peak values are dependent on the value of the partial capacitances 16.1, 16.2 and 16.13. In FIGS. 4 and 5 w stands for rotational angle displacement and x for path displacement FIG. 6 represents the locus curve of the receiver voltages 17.1. It can be seen that the amplitudes of the receiver voltages 17.1 fluctuates periodically about the value 30, which is due to the response of the partial capacitances 16.1, 16.2, 16.3 and derives from FIG. 7. The dependence between the displacement 19 and the response of the partial capacitances 16.1, 16.2 and 16.3 is illustrated in FIG. 7 for the receiver voltage 17.1.

The displacement position X corresponds to the transducer position shown in FIG. 3. The partial capacitances 16.1, 16.2 and 16.3 appear as a function of the displacement path 19. Here a purely sinusoidal response of the partial capacitances would be ideal, as it would lead to a constant amplitude response of the receiver voltage 17.1. To achieve this, however, a complicated geometry of the capacitor coatings would be required. With the displacement of the sensing unit 2 by one scale period 1, corresponding to the value 12 in FIG. 1 or 11 in FIG. 2, there results a phase shift of $\phi$ 18.1 by 360°. Using e.g. a scale period of T=3 mm, in the configuration of the transducer according to FIGS. 1 and 2, upon displacement by one scale period T the phase angle error of the receiver voltages is ±1.1°. This corresponds to an uncertainty of the displacement 19 of ±0.0092 mm. This phase angle error is largely compensated by the linking of the two received signals 17.1 and 17.2 in the electronic circuit system.

FIG. 8 shows the block diagram for the electronic circuit system for digital measuring of a displacement or of an angle.

The capacitive transducer is included in a digital system. Power supply to the transducer occurs with three A.C. voltages phase-shifted by 120°, preferably sinusoidal voltages which are generated in the transmitting voltage generating unit 20 by known methods from square signals. Feeding with digital signals which contain only harmonics of higher order is, of course, possible also. Such harmonics are indeed transmitted into the output signal of the transducer, but they can be eliminated with a filter 21 connected ahead of the zero crossing detector 22. Thereby a square receiver signal is produced, whose phase position relative to the digital reference signal of equal frequency, which is generated in the reference divider 23, contains the data of the mechanical quantity to be measured. The phase evaluation takes place in a control circuit, in that the reference signal is continuously synchronized with the receiver signal in the synchronization stage 25. By a phase comparison 24 of the two signals a pulse is generated whose width is proportional to the phase shift. Firstly, this pulse controls the synchronization stage 25, which by mixing in or blanking out of pulses synchronizes the reference divider 23 to the receiver signal. This means that the phase shift is controlled to zero. Secondly, the pulse generated in the phase comparator 24 controls a gate 26 for a clock frequency of a counter 27. The entire system is controlled by a clock pulse supplied by a crystal-stabilized oscillator 28.

If the clock frequencies and control signals are correctly correlated in the system, the count equals the value of the mechanical quantity to be measured.

Following the oscillator 28 is a frequency divider 29. From the frequency divider 29 the further course is via the transmission voltage generation 20 to a capacitive pickup 1,2 to a differential amplifier 43. 31 is a display and 32 a micro-computer, to which the counter 27 is connected.

Figure 9:
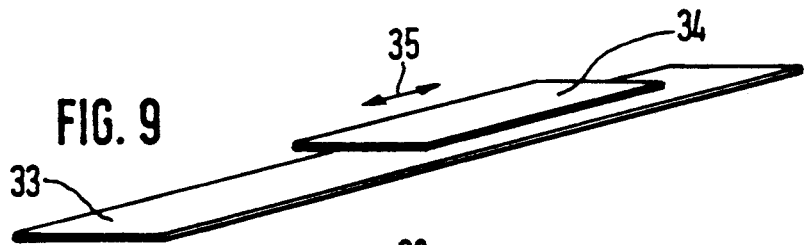
FIG. 9 is a perspective view of one embodiment of a length measuring device of the invention.

FIG. 9 shows a length measuring system consisting of a scale 33 and the sensing unit 34. The sensing unit 34 is displaceable parallel to the scale in the direction of arrow 35.

Figure 10:
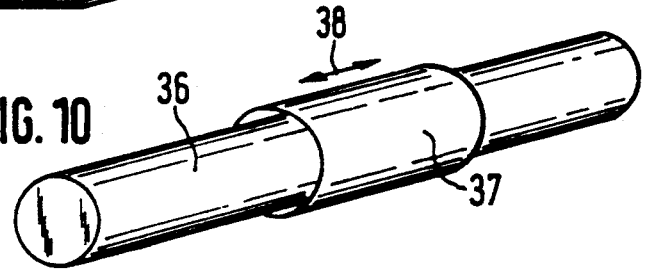
FIG. 10 is a view similar to FIG. 9 of another realization of a length measuring device of the invention.

Another type of length measuring system is shown in FIG. 10. The scale 36 is formed as a round bar over which a hollow cylindrical sensing unit 37 is axially displaceable in direction 38.

Figure 11:
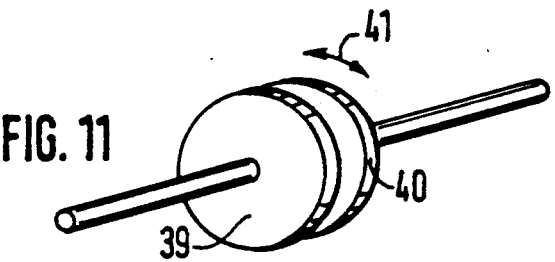
FIG. 11 is a view similar to FIG. 9 of an angle measuring device of the invention.

An angle measuring device is illustrated in FIG. 11. The stationary part 39 as scale as the form of a circular disc. Parallel to this circular disc 39 is another disc 40, which constitutes the sensing unit and is displaceable about its central axis direction 41.

In FIGS. 9,10 and 11, the interengaged T-shaped coatings 5,6 are reproduced on the scale parts 33, 36, 39. In the embodiment of FIG. 10, the shapes must of course be curved to engage around the bar and in the embodiment of FIG. 11, the interlocked T-shapes must be distorted so as to follow around the surface of the disc 39. In this embodiment for example, the crosses of the T-shaped coatings 5, near the axis of disc 39, would be shorter than the crosses for the T-shaped coatings 6, near the periphery of the disc 39. The legs or webs of each T-shaped coating would also taper so as to conform to the disc shape.

While specific embodiments of the invention have been shown and described in detail to illustrate the application of the principles of the invention, it will be understood that the invention may be embodied otherwise without departing from such principles.

What is claimed is:

1. A capacitive displacement measuring device, comprising:

A stationary scale member (1) having a surface (3);
two rows of interengaged T-shaped electrically independent capacitor scale coatings (5,6) defined on said scale member surface, each capacitor scale coating having a leg and a cross with a cross of a scale coating in one row engaged at least partly over a leg of a scale coating of the other row;
a movable sensor member (2) having a surface (4) overlying, facing and spaced from said surface (3) of said stationary scale member, said movable sensor member being movable in a selected direction over said stationary scale member and having an axis extending in said selected direction;
a plurality of transmitting electrode capacitor coatings (7.1, 7.2, 7.3), disposed on said surface (4) of said movable sensor member and overlying at least part of at least some of said capacitor scale coatings;
a plurality of receiving electrode capacitor coatings (8, 9) on said surface (4) of said sensor member, spaced with respect to and electrically isolated from said transmitting electrode coatings;

a grounded shield on said surface (4) of said sensor member disposed in a space between said transmitting and receiving electrode coatings to isolate said transmitting electrode coatings from said receiving electrode coatings; and A.C. voltage means connected to said transmitting electrode coatings for applying an electrically rotating field to said plurality of transmitting electrode coatings;

said receiving electrode coatings being disposed with respect to said transmitting electrode coatings to receive a signal transmitted from said transmitting electrode coatings having a phase position which is proportional to a displacement between said stationary scale member and said movable sensor member.

2. A capacitive displacement measuring device according to claim 1, wherein the A.C. voltage applied to said transmitting electrode coatings has a scale period, one of said two rows being offset with respect to the other of said two rows by one half said period.

3. A capacitive displacement measuring device according to claim 1, wherein said stationary scale member and said movable scale member are both plate-shaped, said plurality of transmitting electrode coatings being rectangular and disposed along said axis and being symmetrical about said axis, said receiving electrode coatings comprising one capacitor coating spaced from each end of said transmitting electrode coating said receiving electrode coatings extending perpendicularly to said transmitting electrode coatings.

4. A capacitive displacement measuring device according to claim 1, including A.C. detection means connected to said receiving electrode coatings for converting said received signals into a displacement signal, no electrical equipment being connected to said capacitor scale coatings.

5. A capacitive displacement measuring device according to claim 4, wherein said A.C. voltage means applies sinusoidal voltages to said plurality of transmitting electrode coatings and includes square wave means for generating a square wave and for deriving a sinusoidal wave from said square wave, said A.C. detection means comprising a differential amplifier connected to said receiving electrode coatings and digitization means including a zero crossing detector connected to said differential amplifier for converting said received signal of said receiving electrode coatings into a digitized displacement signal.

6. A capacitive displacement measuring device according to claim 5, wherein said digitization means comprises a phase comparator having one input for receiving an output from said cross zero detector, a second input and an output, a synchronization stage connected to said phase comparator output for controlling a phase of a signal from said phase comparator to zero and a reference signal divider connected between said synchronization stage and said second input of said phase comparator for applying a signal to said phase comparator to be compared with respect to phase with a signal from said zero cross detector.

7. A compacitive displacement measuring device according to claim 6, including a gate connected to said output of said phase comparator and a counter connected to said gate, said gate being controlled in synchronizm with said A.C. voltage means for applying signals to said counter which counts signals, a counter signals corresponding to displacement measured by said device.

8. A capacitive displacement measuring device according to claim 7, wherein said plurality of transmitting electrode coatings are each rectangular and extend along said axis and are symmetrical with respect to said axis, one of said receiving electrode coatings extending on one side of said transmitting electrode coatings and another of said receiving electrode coatings disposed on an opposite side of said transmitting electrode coatings, said receiving electrode coatings being perpendicular to said receiving electrode coatings.

9. A capacitive displacement measuring device according to claim 1, wherein said transmitting electrode coatings are divided into adjacent groups of three transmitting electrode coatings, one transmitting electrode of each group connected to said A.C. voltage means for receiving A.C. voltage at the same phase with adjacent ones of said transmitting electrode coatings in each group receiving A.C. voltage at successively different phases.

10. A capacitive displacement measuring device according to claim 1, wherein said stationary scale member comprises a cylindrical bar with an outer surface of said cylindrical bar defining said surface of said stationary scale member, said movable sensor member comprising a sleeve having an inner surface forming said surface of said movable sensor member and engaged around said bar.

11. A capacitive displacement device according to claim 1, wherein said stationary scale member comprises a disc having a circular surface defining said surface of said stationary scale member, said movable sensor member comprising a disc having a surface facing said surface of said stationary scale member and defining said surfae of said movable sensor member.

* * * * *